US009251105B2

(12) United States Patent
Tran et al.

(10) Patent No.: US 9,251,105 B2
(45) Date of Patent: Feb. 2, 2016

(54) TRANSMITTING AN INTERRUPT PACKET (71) Applicant: Intel Corporation, Santa Clara, CA (US)

(72) Inventors: Dzung Tran, Beaverton, OR (US); James Trethewey, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 13/682,269

(22) Filed: Nov. 20, 2012

(65) Prior Publication Data

US 2014/0143469 A1    May 22, 2014

(51) Int. Cl.
*G06F 13/24* (2006.01)

(52) U.S. Cl.
CPC ........ *G06F 13/24* (2013.01); *G06F 2213/2408* (2013.01)

(58) Field of Classification Search
CPC .......................... G06F 2213/2408; G06F 13/24
IPC ....................................................... G06F 13/24
See application file for complete search history.

(56) References Cited

U.S. PATENT DOCUMENTS

| 6,058,441 | A | 5/2000 | Shu |
| 6,434,643 | B1 | 8/2002 | Ejiri |
| 7,209,470 | B2 * | 4/2007 | McGowan ..................... 370/349 |
| 7,269,171 | B2 * | 9/2007 | Poon et al. .................... 370/392 |
| 7,391,769 | B2 * | 6/2008 | Rajkumar et al. ............ 370/389 |
| 7,409,485 | B1 * | 8/2008 | Sartin ........................... 710/305 |
| 7,876,764 | B2 * | 1/2011 | Binetti et al. ............ 370/395.53 |
| 8,250,245 | B2 | 8/2012 | Tanaka |
| 8,325,151 | B1 * | 12/2012 | Chan et al. ..................... 345/173 |
| 8,504,755 | B2 * | 8/2013 | Beadnell et al. ............... 710/313 |
| 8,914,566 | B2 * | 12/2014 | Vandervalk et al. .......... 710/260 |
| 8,983,460 | B2 | 3/2015 | Trethewey et al. |
| 8,997,121 | B2 | 3/2015 | Trethewey et al. |
| 9,015,368 | B2 * | 4/2015 | Christison et al. .............. 710/35 |
| 9,021,143 | B2 | 4/2015 | Chandrasekaran et al. |
| 2006/0069543 | A1 | 3/2006 | Sajwani et al. |
| 2006/0142991 | A1 | 6/2006 | Sajwani et al. |
| 2006/0143314 | A1 | 6/2006 | Sinha et al. |
| 2007/0006146 | A1 | 1/2007 | Kwong et al. |

(Continued)

FOREIGN PATENT DOCUMENTS

| CN | 101287343 B | 11/2011 |
| JP | 3711432 B2 | 11/2005 |

(Continued)

OTHER PUBLICATIONS

Bluetooth Specification—"Human Interface Device Profile 1.1"—123 pages, Dated Feb. 21, 2012.*

(Continued)

*Primary Examiner* — Brian Misiura
(74) *Attorney, Agent, or Firm* — International IP Law Group, P.L.L.C.

(57) ABSTRACT

A method and system for transmitting an aggregated interrupt packet are described herein. The method includes sending metadata from a client device to a host device. The method also includes detecting at least two sets of data from the client device. Additionally, the method includes detecting an identifier for the client device. Furthermore, the method includes generating an aggregated interrupt packet in the client device that comprises the identifier and the at least two sets of data for the client device. The method also includes sending the aggregated interrupt packet from the client device to the host device.

24 Claims, 5 Drawing Sheets

(56) References Cited

U.S. PATENT DOCUMENTS

| | | |
|---|---|---|
| 2007/0079030 A1 | 4/2007 | Okuley et al. |
| 2008/0157345 A1 | 7/2008 | Lu et al. |
| 2008/0251338 A1 | 10/2008 | Golden et al. |
| 2014/0071147 A1 | 3/2014 | Trethewey et al. |
| 2014/0075178 A1 | 3/2014 | Trethewey |
| 2014/0146021 A1* | 5/2014 | Trethewey et al. ........... 345/179 |
| 2014/0149062 A1* | 5/2014 | Chandrasekaran et al. .. 702/104 |
| 2014/0156895 A1* | 6/2014 | Chandrasekaran et al. .. 710/260 |
| 2014/0281109 A1 | 9/2014 | Trethewey |
| 2014/0281113 A1 | 9/2014 | Trethewey |

FOREIGN PATENT DOCUMENTS

| | | |
|---|---|---|
| KR | 10-2008-0088885 | 10/2008 |
| TW | 200908903 A | 3/2009 |

\* cited by examiner

TRANSMITTING AN INTERRUPT PACKET

TECHNICAL FIELD

This disclosure relates generally to transmitting data in a computing device and more specifically, but not exclusively, to transmitting an interrupt packet.

BACKGROUND

Modern computing devices continue to incorporate a growing number of components. For example, modern computing devices may include any suitable number of sensors and I/O devices, among others. Each component may transfer data to a storage device or processor using a common bus. For example, a universal serial bus (also referred to herein as USB) may transfer data for any suitable number of components.

DETAILED DESCRIPTION

In some computing devices, USB devices can transmit data through USB interrupt packets. However, transmitting data through USB interrupt packets can be inefficient. For example, the USB interrupt packets may have a fixed size and each USB component may send a particular amount of data in a USB interrupt packet. For example, a USB component may transmit a fixed amount of data, such as a fixed number of bytes, each time the USB component sends data to a computing device. However, a USB component may include less data in a USB interrupt packet than a USB interrupt packet can transmit. For example, a USB component may include 10 bytes of data in a USB interrupt packet that can transmit 64 bytes of data. In this example, 54 bytes of data in a USB interrupt packet may not transmit any data for a USB component.

According to embodiments of the subject matter disclosed herein, aggregated interrupt packets can be sent from a client device to a host device. A client device, as referred to herein, includes any computing device, computing component, or software application that can transmit data to a host device. In some embodiments, a client device can be a USB device, a Human Interface Device (also referred to herein as HID), a controller, a sensor controller, or a touch screen display, among others. A host device, as referred to herein, includes any computing device, computing component, or software application that can receive data transmitted from a client device. In some embodiments, a host device can include a controller, a storage device, or an operating system, among others. An aggregated interrupt packet can be used to transmit data for any suitable number of components. For example, an aggregated interrupt packet may include data for multiple USB components that are combined into a single USB interrupt packet. In some embodiments, data for each USB component may be located proximate data from other USB components. In some examples, an aggregated interrupt packet may include multiple sets of data for a particular USB device. For example, a touch screen display device may detect multiple sets of data when a user simultaneously touches multiple portions of the touch screen display device. In some embodiments, the touch screen display can generate an aggregated interrupt packet that includes the multiple sets of data that the touch screen display detected. Sending an aggregated interrupt packet from a USB component to an operating system can reduce the inefficiencies of USB interrupt packets by transmitting data for multiple devices in a single interrupt packet.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
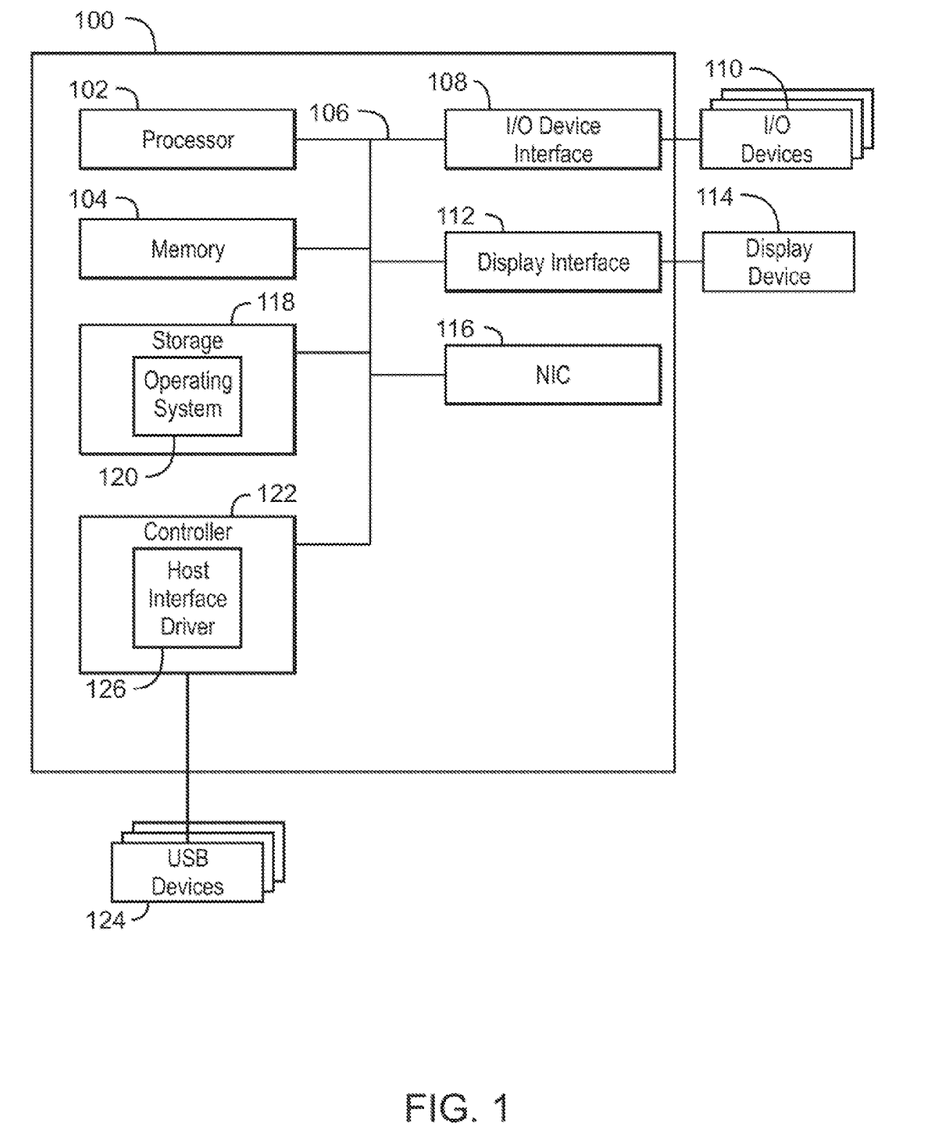
FIG. 1 is a block diagram of an example of a computing system that enables a USB device to send an aggregated interrupt packet to an operating system.

FIG. 1 is a block diagram of an example of a computing system that enables a USB device to send an aggregated interrupt packet to an operating system. The computing system 100 may be, for example, a mobile phone, laptop computer, ultrabook, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein. For example, the instructions that are executed by the processor 102 may be used to implement a method that sends an aggregated interrupt packet.

The processor 102 may be connected through a system interconnect 106 (e.g., PCI, ISA, PCI-Express®, Hyper-Transport®, NuInterconnect, etc.) to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system interconnect 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. The processor 102 may also be linked through the system interconnect 106 to a network interface card (NIC) 116. The NIC 116 may be adapted to connect the computing system 100 through the system interconnect 106 to a network (not depicted). The network may be a wide area network (WAN), local area network (LAN), or the Internet, among others.

The computing device 100 may also include a storage device 118. The storage device 118 may include a physical memory such as a hard drive, an optical drive, a flash drive, an array of drives, or any combinations thereof. The storage device 118 may also include remote storage drives. The storage device 118 may also include an operating system 120. In some embodiments, the storage device 118 may store instructions thereon to receive an aggregated interrupt packet from a controller 122. In some embodiments, the operating system 120 may include one or more drivers. The drivers can enable a hardware component or an application to communicate with the operating system 120. The drivers may also be used to enable a controller 122 to communicate data from USB devices 124 to an application via the operating system 120, in accordance with some embodiments. In some embodiments, the drivers are stored in the memory device 104. The memory device 104 may include instructions used to process aggregated interrupt packets in a similar manner as described in reference to the operating system 120 above.

The controller 122 may include a host interface driver (also referred to herein as a USB micro-driver) 126. In some embodiments, the USB micro-driver 126 can send an aggregated interrupt packet to the operating system 120 when the controller 122 has at least two sets of data to transmit to the operating system 120 from at least one USB device 124. For example, the USB micro-driver 126 may combine any suitable number of sets of data from at least one USB device 124 into a single aggregated interrupt packet. In some embodiments, the USB devices 124 may include any suitable number of sensors that collect sensor data. Sensor data can include any information that is detected by a sensor, such as the tilt of a computing device, the direction a computing device is traveling, or the velocity of a computing device, among others. In some embodiments, the sensor data collected by the sensors can be transmitted to the controller 122, which can generate an aggregated interrupt packet with the USB micro-driver 126. The controller 122 can also send the sensor data to an operating system 120 encapsulated in the aggregated interrupt packet.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional USB devices, sensors, sensor controllers, etc.). Furthermore, any of the functionalities of the USB micro-driver 126 may be partially, or entirely, implemented in hardware and/or in the processor 102. For example, the functionality may be implemented with an application specific integrated circuit, in a USB micro-driver 126 included in a sensor controller, in a USB device 124, in a processor in a USB device 124, in a co-processor, or in any other device.

Figure 2:
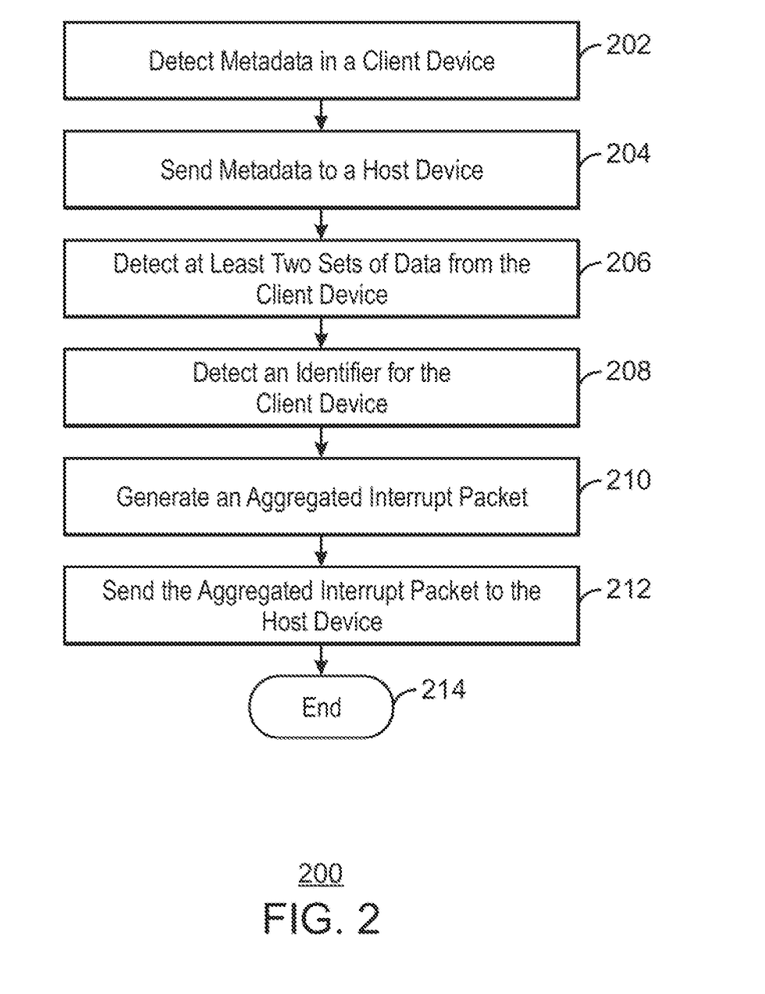
FIG. 2 is a process flow diagram for an example of sending an aggregated interrupt packet from a client device to a host device.

FIG. 2 is a process flow diagram for an example of a method for sending an aggregated interrupt packet from a client device to a host device. The method 200 can be implemented with a computing device, such as the computing system 100 of FIG. 1.

At block 202, a USB micro-driver 126 can detect metadata in a client device. In some embodiments, the client device is a USB device that can transmit data to a computing device. For example, the client device may be a USB sensor, a USB touch screen display device, or a USB keyboard, among others. In other embodiments, the client device may be a controller in a computing system that can detect data from devices and send the data to an operating system as an aggregated interrupt packet. In some embodiments, the client device may detect metadata prior to sending an aggregated interrupt packet to an operating system. The metadata may include the fixed number of bytes that a client device transmits in each aggregated interrupt packet, whether the data transmitted by a client device represents a single value or an array of values, a minimum and maximum valid data range, and units of measurement, among others.

At block 204, a USB micro-driver 126 can send the metadata to a host device. In some embodiments, the host device may be a computing system, such as the computing system 100 of FIG. 1. In other embodiments, the host device may be a storage device that includes an operating system. For example, the metadata may be sent from a USB controller to an operating system residing in a storage device using a USB interface, among others.

At block 206, a USB micro-driver 126 can detect at least two sets of data from the client device. In some embodiments, the data can include any data that a client device attempts to send to the host device. In some examples, the client device may detect the data from any suitable number of sensors. For example, the data may include sensor data that the sensors transmit to an operating system through a USB controller. In some embodiments, the data may include data detected by a touch screen display device or a USB keyboard device, among others.

At block 208, the USB micro-driver 126 can detect an identifier for the client device. In some embodiments, each component in a computing system may have a unique identifier that is used to enable a particular component to communicate with an operating system. For example, each USB device, such as a sensor or touch screen display, among others, may have unique identifiers that are associated with each set of data sent to an operating system.

At block 210, the USB micro-driver 126 can generate an aggregated interrupt packet. In some embodiments, the aggregated interrupt packet may include sets of data from any suitable number of USB devices. For example, the client device may detect sets of data from any suitable number of sensors and may combine the sets of data into a single aggregated interrupt packet. In some embodiments, the identifier for each USB device may be included in the aggregated interrupt packet proximate to the sets of data generated by the USB device.

At block 212, the USB micro-driver 126 can send the aggregated interrupt packet to the host device. In some embodiments, the host device can include an operating system that resides in a storage device. The operating system can detect the aggregated interrupt packet and detect the sets of data using the metadata. In some examples, the metadata can indicate the number of bytes of data that follow a particular identifier. For example, the host device can use the metadata to determine which bytes of data correspond to identifiers and which bytes of data correspond with sets of data for a particular USB component. In some embodiments, the host device can split the interrupt packet into at least two sets of data based on the metadata and the host device can send the at least two sets of data to an application. An example of an aggregated interrupt packet is discussed in greater detail below in relation to FIG. 4. The process flow ends at block 214.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, the client device may transmit additional identifying information regarding the client device and sets of data.

Figure 3:
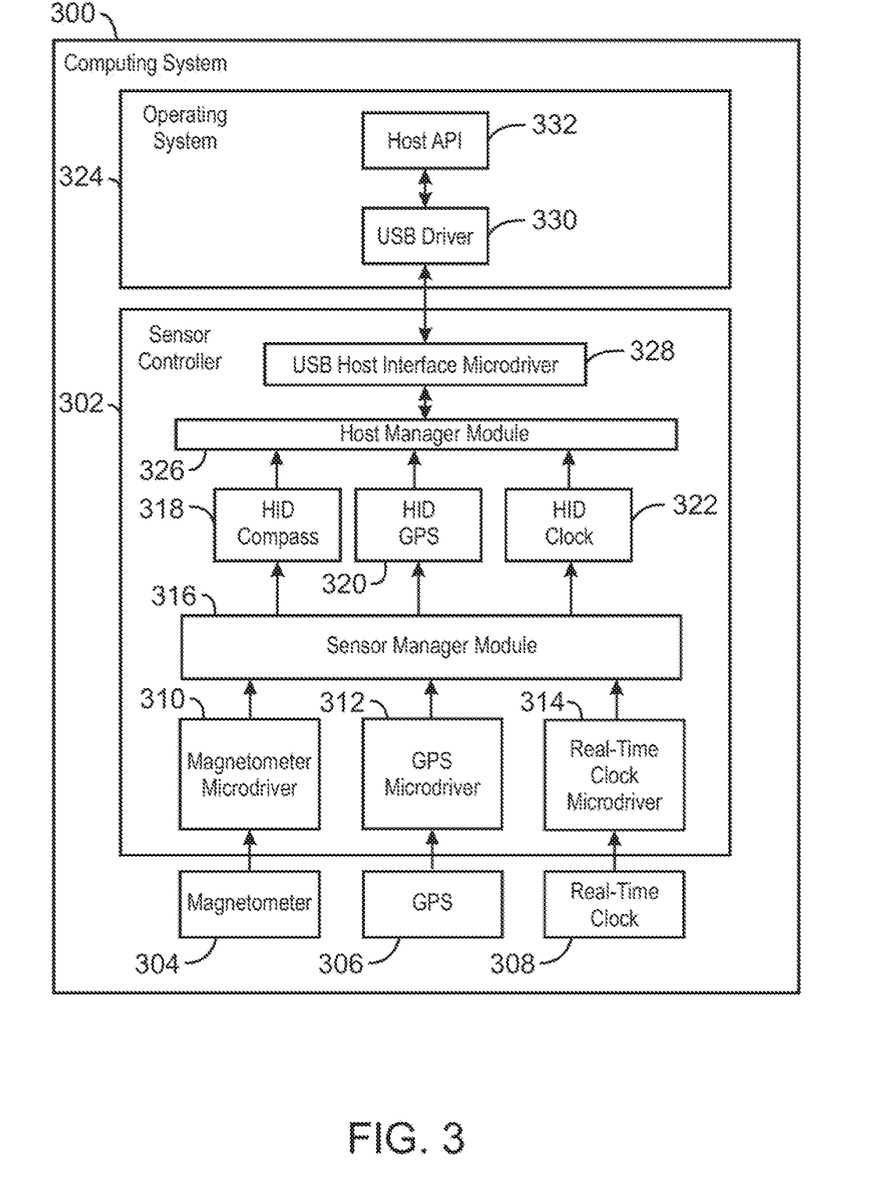
FIG. 3 is a block diagram of an example of a sensor controller sending an aggregated interrupt packet to an operating system.

FIG. 3 is a block diagram of an example of a sensor controller sending an aggregated interrupt packet to an operating system. In some embodiments, a computing system 300 may include the sensor controller 302. In some embodiments, the sensor controller 302 can communicate with any suitable number of sensors, such as a magnetometer 304, a GPS radio 306, and a real-time clock 308, among others. The magnetometer 304 can detect data related to the strength or direction of magnetic fields. The GPS radio 306 can detect data related to the location of a computing device. For example, the GPS radio 306 may detect the latitude and longitude of a computing device. The real-time clock 308 can detect the time, such as the International Atomic Time, among others, from a standard time source.

In some embodiments, the sensor controller 302 can include any suitable number of micro-drivers that can communicate with any suitable number of sensors. For example, the sensor controller 302 may include a magnetometer micro-driver 310, a GPS radio micro-driver 312, and a real-time clock micro-driver 314. The magnetometer micro-driver 310, GPS radio micro-driver 312, and real-time clock micro-driver 314 may include firmware that can enable communication between the sensors and a sensor manager module 316. For example, the magnetometer micro-driver 310 may include firmware that can detect data from a particular magnetometer sensor 304 and forward the data from the magnetometer sensor 304 to the sensor manager module 316. In some embodiments, the GPS radio micro-driver 312 may include firmware that can detect data from a particular GPS radio 306 and forward the data from the GPS radio 306 to the sensor manager module 316. In some embodiments, the real-time clock micro-driver 314 may include firmware that can detect data from a particular real-time clock 308 and forward the data from the real-time clock 308 to the sensor manager module 316.

In some embodiments, the sensor manager module 316 may analyze data gathered by one or more of the sensors 304, 306, and 308. For example, the sensor manager module 316 may determine position data or angular velocity data, among others, for a computing device based on data received from one or more of the sensors 304, 306, and 308 through one or more of the micro-drivers 310, 312, and 314.

The sensor controller 302 may also include one or more HID logical devices 318, 320, and 322. In some embodiments, the HID logical devices may include a HID logical compass 318, a HID logical GPS 320, and a HID real-time clock 322, among others. The HID logical devices 318, 320, and 322 may be configured to format the data received by the sensor manager module 316. For example, the sensor controller 302 may format data received from one or more of the sensors 304, 306, and 308 by packaging the data to enable the operating system 324 to detect individual sensor data transmitted through a single system interconnect, such as a bus. In some embodiments, one or more of the HID logical devices 318, 320, and 322 can enable the sensor controller 302 to format data to enable the operating system 324 to detect individual sensors according to HID specifications.

The sensor controller 302 may also include a host manager module 326 that can send data received from the HID logical compass 318, the HID logical GPS 320, and the HID logical real-time clock 322 to a USB host interface micro-driver 328. The USB host interface micro-driver (also referred to herein as a USB micro-driver) 328 can aggregate the data from the host manager module 326 and transmit the data from the host manager module 326 to the Host API 332 through the USB driver 330 in the operating system 324. For example, the USB micro-driver 328 may aggregate data, such as position data, among others, detected by the sensors 304, 306, and 308 and send the aggregated data to the operating system 324 in some embodiments, the USB micro-driver 328 aggregates the formatted HID and non-vendor specific data into a single aggregated interrupt packet to enable the sensor controller 302 to provide the formatted data to the operating system 324 via a single channel. An aggregated interrupt packet that includes sensor data from multiple sensors is discussed in greater detail below in relation to FIG. 4. By providing data from multiple sensors in a single aggregated interrupt packet, the sensor controller 302 can transmit more data to the operating system 324 with fewer interrupt packets.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional sensors, additional drivers, additional devices, etc.).

Figure 4:
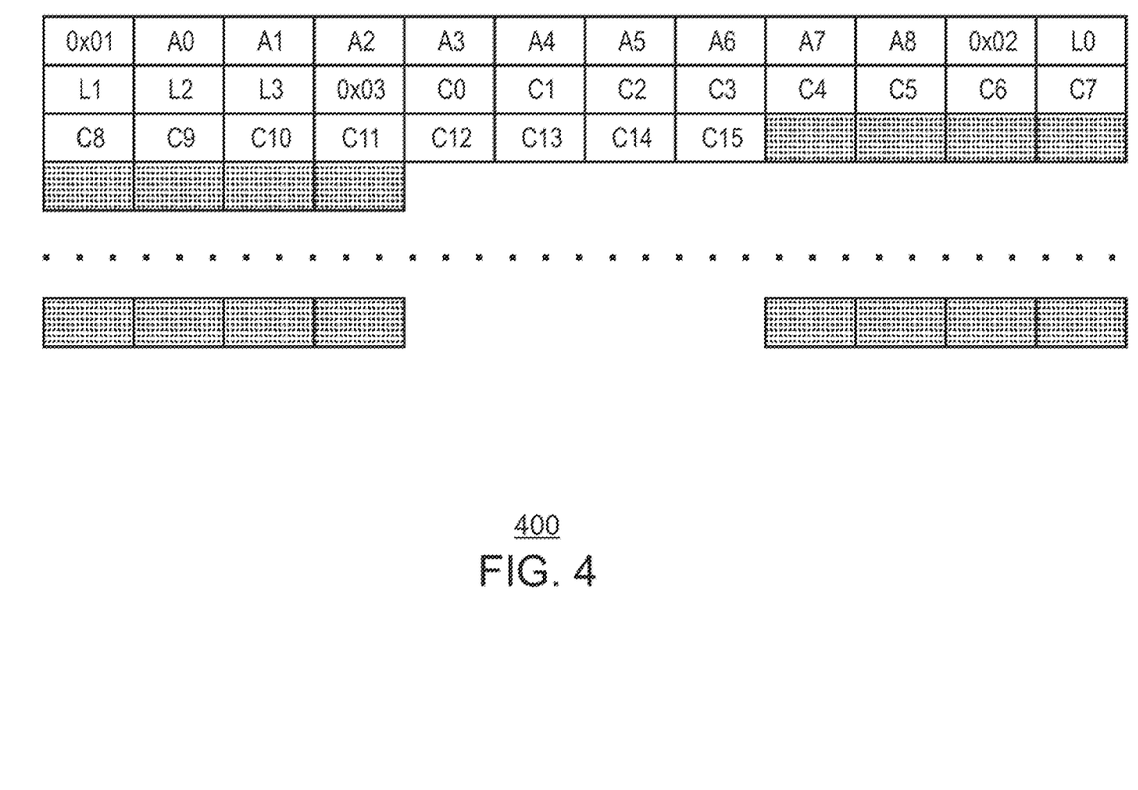
FIG. 4 is an example of an aggregated interrupt packet.

FIG. 4 is an example of an aggregated interrupt packet. The aggregated interrupt packet 400 can include data from any suitable number of devices. For example, the aggregated interrupt packet may include any number of sets of data from any suitable number of devices. In some embodiments, an identifier 0x01, 0x02, 0x03, may be included in the aggregated interrupt packet before each set of data from a device. For example, a byte of information that identifies a particular device 0x01, 0x02, 0x03, may be included in the aggregated interrupt packet prior to a set of data from the device. The aggregated interrupt packet may also include any number of bytes of data that represent a set of data. In some examples, each byte of data in a set of data may represent data for a particular field. For example, an accelerometer may include nine bytes of data in a set of data A0, A1, A2, A3, A4, A5, A6, A7, and A8. Each of the nine bytes of data generated by the accelerometer may correspond to a different field. For example, the first byte of data from the accelerometer A0 may correspond with acceleration of a computing device around an X axis. The second byte of data from the accelerometer A1 may correspond with acceleration of a computing device around a Y axis and a third byte of data from the accelerometer A2 may correspond with acceleration of a computing device around a Z axis.

Subsequent to the first identifier 0x01 and the first set of data from a device A0, . . . , A9, the aggregated interrupt packet 400 may include a second identifier 0x02 and a second set of data L0, L1, L2, and L3. For example, a second identifier 0x02 may indicate that a second set of data from an ambient light is included in the aggregated interrupt packet 400. The second set of data L0, . . . , L3 can include any suitable number of bytes that transmit the data for the second device. For example, three bytes of data L0, L1, and L2 may indicate the parameters reported by an ambient light sensor. In some embodiments, the ambient light sensor can report parameters such as visible light (e.g., in units of lux), infrared light (e.g., in units of lux), and light chromaticity (e.g., color of the light in CIE coordinates), among others.

In some embodiments, the second identifier 0x02 and second set of data L0, L1, L2, and L3 may be followed by any suitable number of additional identifiers 0x03 and sets of data C0, . . . , C15. If all the bytes of a set of data cannot be included in an aggregated interrupt packet 400, a portion of the bytes of data from the set of data may be included in a subsequent aggregated interrupt packet. For example, an aggregated interrupt packet 400 may have a fixed size of 64 bytes. In some examples, a set of data may include 10 bytes, but the first byte of the set of data is included at byte 60 of the aggregated interrupt packet. In these examples, the first five bytes of data from the set of data may be included in an aggregated interrupt packet 400, while the last five bytes of data from the set of data may be included in a subsequent aggregated interrupt packet.

In some embodiments, the aggregated interrupt packets 400 can be encapsulated in an internet protocol packet. For example, a TCP/IP packet may include an aggregated interrupt packet as the data included in the TCP/IP packet. In embodiments that encapsulate aggregated interrupt packets in an internet protocol packet, the internet protocol may ensure that the internet protocol packets are delivered in sequential order.

Figure 5:
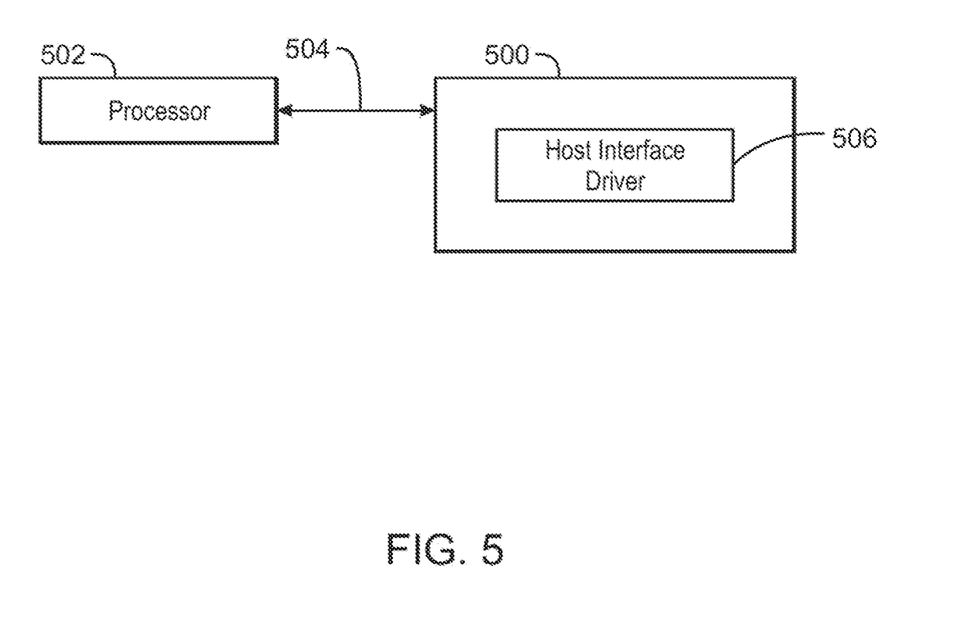
FIG. 5 is a tangible, non-transitory computer-readable medium that can enable a USB device to send an aggregated interrupt packet to an operating system.

FIG. 5 is a tangible, non-transitory computer-readable medium that can enable a USB device to send an aggregated interrupt packet to an operating system. The tangible, non-transitory, computer-readable medium 500 may be accessed by a processor 502 over a computer interconnect 504. Furthermore, the tangible, non-transitory, computer-readable medium 500 may include code to direct the processor 502 to perform the steps of the current method.

The various software components discussed herein may be stored on the tangible, non-transitory, computer-readable medium 500, as indicated in FIG. 5. For example, a host interface driver 506 may be adapted to direct the processor 502 to send an aggregated interrupt packet to a host device. It is to be understood that any number of additional software components not shown in FIG. 5 may be included within the tangible, non-transitory, computer-readable medium 500, depending on the specific application.

Example 1

A method for transmitting an aggregated interrupt packet is described herein. The method can include sending metadata from a client device to a host device and detecting at least two sets of data from the client device. The method can also include detecting an identifier for the client device. Additionally, the method can include generating an aggregated interrupt packet in the client device that comprises the identifier and the at least two sets of data for the client device. Furthermore, the method can include sending the aggregated interrupt packet from the client device to the host device.

In some embodiments, the client device is a USB device. For example, the client device can be a touchscreen display, or a sensor controller, among other devices. In some embodiments, the metadata indicates the number of bytes the client device transmits in each set of data and the field of each byte of data. For example, the metadata can indicate whether the data transmitted by a client device is a single value or if the data represents an array of values.

Example 2

A system for transmitting an aggregated interrupt packet is also described herein. The system comprises a client device that transmits the aggregated interrupt packet, a processor to execute computer-readable instructions, and a storage device to store computer-readable instructions. The computer-readable instructions, when executed by the processor, can detect metadata from the client device and send metadata from the client device to a host device. The computer-readable instructions can also detect at least two sets of data from the client device and detect an identifier for the client device. Additionally, the computer-readable instructions can generate an aggregated interrupt packet in the client device that comprises the identifier and the at least two sets of data for the client device and send the aggregated interrupt packet from the client device to the host device.

In some embodiments, the computer-readable instructions can cause the system to encapsulate the aggregated interrupt packet in an internet protocol packet and send the aggregated interrupt packet using an internet protocol. In some examples, the aggregated interrupt packet can be transmitted with a USB standard using a wireless protocol. In some embodiments, the sets of data can represent sensor data for any suitable number of sensors.

Example 3

A system for transmitting an aggregated interrupt packet is described herein. The system includes a host device that receives the aggregated interrupt packet, a processor to execute computer-readable instructions, and a storage device to store the computer-readable instructions. The computer-readable instructions can direct a processor to receive metadata from a client device and receive the aggregated interrupt packet from the client device. The computer-readable instructions can also direct the processor to split the aggregated interrupt packet into at least two sets of data. Furthermore, the computer-readable instructions can direct the processor to send the at least two sets of data to an application.

In some embodiments, the aggregated interrupt packet comprises an identifier that identifies the source of each of the two sets of data. In some embodiments, the metadata comprises the number of bytes the client device transmits in each aggregated interrupt packet and the field of each byte of data. In some examples, the computer-readable instructions direct the processor to receive the aggregated interrupt packet from the client device through an internet protocol.

Example 4

At least one non-transitory machine readable medium comprising a plurality of instructions that can transmit an aggregated interrupt packet is described herein. In response to being executed on a computing device, the plurality of instructions can cause the computing device to send metadata from a client device to a host device and detect at least two sets of data from the client device. The plurality of instructions can also cause the computing device to detect an identifier for the client device and generate an aggregated interrupt packet in the client device that comprises the identifier and the at least two sets of data for the client device. Furthermore, the plurality of instructions can cause the computing device to send the aggregated interrupt packet from the client device to the host device.

In some embodiments, the plurality of instructions can cause a sensor to transmit the aggregated interrupt packet. In some embodiments, the metadata indicates the number of bytes the client device transmits in each aggregated interrupt packet and the field of each byte of data. For example, the metadata may indicate that the client device has incorporated data in the aggregated interrupt packet, wherein each byte of the data represents a value for a particular field. In some examples, the fields can correspond to a change in velocity of a computing device, a change in angular velocity of the computing device, or a change in the direction of the computing device, among others.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for transmitting an aggregated interrupt packet comprising:
    sending metadata from a client device to a host device, the client device comprising a sensor controller or a sensor;
    detecting at least two sets of data from the client device;
    detecting an identifier for the client device;
    generating an aggregated interrupt packet in the client device that comprises the identifier and the at least two sets of data for the client device; and
    sending the aggregated interrupt packet from the client device to the host device.

2. The method of claim 1, wherein the client device is a USB device.

3. The method of claim 1, wherein the metadata indicates the number of bytes the client device transmits in each set of data and the field of each byte of data.

4. The method of claim 1, wherein sending the aggregated interrupt packet from the client device to the host device, comprises encapsulating the aggregated interrupt packet in an internet protocol packet and sending the aggregated interrupt packet using an internet protocol.

5. The method of claim 1, wherein sending the aggregated interrupt packet from the client device to the host device comprises sending the aggregated interrupt packet to the host device using a USB standard propagated by a wireless protocol.

6. The method of claim 1, wherein the identifier identifies a source of the at least two sets of data.

7. A system for transmitting an aggregated interrupt packet comprising:
    a client device that transmits the aggregated interrupt packet, the client device comprising a sensor controller or a sensor; and
    a processor to:
        detect metadata from the client device;
        send metadata from the client device to a host device;
        detect at least two sets of data from the client device;
        detect an identifier for the client device;
        generate an aggregated interrupt packet in the client device that comprises the identifier and the at least two sets of data for the client device; and
        send the aggregated interrupt packet from the client device to the host device.

8. The system of claim 7, wherein the client device is a USB device.

9. The system of claim 7, wherein the metadata indicates the number of bytes the client device transmits in each set of data and the field of each byte of data.

10. A system for transmitting an aggregated interrupt packet comprising:
a client device that transmits the aggregated interrupt packet; and
a processor to:
detect metadata from the client device;
send metadata from the client device to a host device;
detect at least two sets of data from the client device;
detect an identifier for the client device;
generate an aggregated interrupt packet in the client device that comprises the identifier and the at least two sets of data for the client device, the aggregated interrupt packet to be encapsulated in an internet protocol packet; and
send the aggregated interrupt packet from the client device to the host device using an internet protocol.

11. The system of claim 7, wherein the identifier identifies a source of each of the at least two sets of data.

12. The system of claim 7, wherein the processor is to send the aggregated interrupt packet to the host device using a USB standard with a wireless protocol.

13. A system for transmitting an aggregated interrupt packet comprising:
a host device that receives the aggregated interrupt packet; and
a processor to:
receive metadata from a client device, the client device comprising a sensor controller or a sensor;
receive the aggregated interrupt packet from the client device;
split the aggregated interrupt packet into at least two sets of data; and
send the at least two sets of data to an application.

14. The system of claim 13, wherein the client device is a USB device.

15. The system of claim 13, wherein the aggregated interrupt packet comprises an identifier that identifies the source of each of the two sets of data.

16. The system of claim 13, wherein the metadata comprises the number of bytes the client device transmits in each aggregated interrupt packet and the field of each byte of data.

17. A system for transmitting an aggregated interrupt packet comprising:
a host device that receives the aggregated interrupt packet; and
a processor to:
receive metadata from a client device;
receive the aggregated interrupt packet from the client device through an internet protocol;
split the aggregated interrupt packet into at least two sets of data; and
send the at least two sets of data to an application.

18. The system of claim 17, wherein the client device is a sensor controller.

19. The system of claim 17, wherein the client device is a sensor.

20. At least one non-transitory machine readable medium comprising a plurality of instructions that, in response to being executed on a computing device, cause the computing device to:
send metadata from a client device to a host device, the client device comprising a sensor controller or a sensor;
detect at least two sets of data from the client device;
detect an identifier for the client device;
generate an aggregated interrupt packet in the client device that comprises the identifier and the at least two sets of data for the client device; and
send the aggregated interrupt packet from the client device to the host device.

21. The at least one non-transitory machine readable medium of claim 20, wherein the client device is a USB device.

22. The at least one non-transitory machine readable medium of claim 20, wherein the metadata indicates the number of bytes the client device transmits in each aggregated interrupt packet and the field of each byte of data.

23. The at least one non-transitory machine readable medium of claim 20, wherein the plurality of instructions cause the computing device to encapsulate the aggregated interrupt packet in an internet protocol packet and send the aggregated interrupt packet using an internet protocol.

24. The at least one non-transitory machine readable medium of claim 20, wherein the identifier identifies a source of each of the at least two sets of data.

* * * * *